(12) United States Patent
Hills et al.

(10) Patent No.: US 10,576,680 B2
(45) Date of Patent: Mar. 3, 2020

(54) MODULAR THERMOFORMING SYSTEM

(71) Applicant: The Boeing Company, Chicago, IL (US)

(72) Inventors: Karen L. Hills, Everett, WA (US); Sergio H. Sanchez, Seattle, WA (US); Douglas Alan Brown, Edmonds, WA (US); Jason Christopher Lail, Everett, WA (US); Michael John Cloud, Snohomish, WA (US); Jason Turner, Marysville, WA (US); Richard V. Phillips, Enumclaw, WA (US); Robert Cook, Edmonds, WA (US); Hun Sok Basom, Bothell, WA (US); DeWayne F. Wendt, Arlington, WA (US)

(73) Assignee: The Boeing Company, Chicago, IL (US)

( * ) Notice: Subject to any disclaimer, the term of this patent is extended or adjusted under 35 U.S.C. 154(b) by 858 days.

(21) Appl. No.: 14/946,720

(22) Filed: Nov. 19, 2015

(65) Prior Publication Data

US 2017/0144361 A1 May 25, 2017

(51) Int. Cl.
*B29C 51/22* (2006.01)
*B29C 51/26* (2006.01)
(Continued)

(52) U.S. Cl.
CPC ............ *B29C 51/22* (2013.01); *B29C 51/225* (2013.01); *B29C 51/261* (2013.01);
(Continued)

(58) Field of Classification Search
CPC ... B29C 51/082; B29C 51/266; B29C 51/421; B29C 2043/3676; B29C 2043/3678;
(Continued)

(56) References Cited

U.S. PATENT DOCUMENTS

| | | | | |
|---|---|---|---|---|
| 3,099,043 A | * | 7/1963 | Held, Jr. | ............. B29C 49/0047 264/297.7 |
| 3,181,202 A | * | 5/1965 | Martelli | ................. B29C 51/04 264/551 |

(Continued)

FOREIGN PATENT DOCUMENTS

| | | |
|---|---|---|
| DE | 3929135 C1 | 10/1990 |
| DE | 10022269 A1 | 11/2001 |

(Continued)

OTHER PUBLICATIONS

European Patent Office, Extended European Search Report in EP Patent Application No. 16198658.3-1706, dated Jul. 14, 2017, 15 pages.

(Continued)

*Primary Examiner* — Jeffrey M Wollschlager
(74) *Attorney, Agent, or Firm* — Kolisch Hartwell, P.C.

(57) ABSTRACT

A thermoforming system and related methods for manufacturing thermoplastic parts, such as interior panels for aircraft, may include a roll-to-roll operation and a forming press having at least one selectively rotatable tool. The rotatable tool, which may include a mold and/or a die, may be multifaceted, such that different faces of the tool have different mold arrangements for different forming characteristics.

20 Claims, 3 Drawing Sheets

(51) Int. Cl.
  *B29C 51/30* (2006.01)
  *B29C 51/42* (2006.01)
  *B29C 43/04* (2006.01)
  *B29C 43/46* (2006.01)
  *B29C 43/08* (2006.01)
  *B29C 51/20* (2006.01)
  *B29K 101/12* (2006.01)

(52) U.S. Cl.
  CPC ............ *B29C 51/266* (2013.01); *B29C 51/30* (2013.01); *B29C 51/421* (2013.01); *B29C 43/04* (2013.01); *B29C 43/08* (2013.01); *B29C 43/085* (2013.01); *B29C 43/46* (2013.01); *B29C 51/20* (2013.01); *B29C 2043/043* (2013.01); *B29C 2043/461* (2013.01); *B29K 2101/12* (2013.01)

(58) Field of Classification Search
  CPC ... B29C 2043/043; B29C 51/20; B29C 51/22; B29C 51/225; B29C 51/30; B29C 51/261; B29C 2043/461; B29C 43/04; B29C 43/085; B30B 3/00–06; B30B 9/20; B30B 9/202; B30B 9/205; B30B 9/207
  See application file for complete search history.

(56) References Cited

U.S. PATENT DOCUMENTS

| | | | | |
|---|---|---|---|---|
| 3,871,611 A | * | 3/1975 | Taketa | B29C 33/306 249/102 |
| 4,248,822 A | * | 2/1981 | Schmidt | A61F 13/15731 264/154 |
| 4,420,300 A | * | 12/1983 | Winstead | B29C 51/02 425/142 |
| 4,431,397 A | * | 2/1984 | Fried | B29C 33/34 249/137 |
| 4,445,957 A | * | 5/1984 | Harvey | B29C 43/08 156/180 |
| 4,515,546 A | * | 5/1985 | Medwed | B29C 51/04 425/185 |
| 4,551,084 A | * | 11/1985 | Lake | B29C 33/306 249/102 |
| 4,830,596 A | * | 5/1989 | Neu | B29C 51/225 425/388 |
| 5,366,685 A | * | 11/1994 | Fujii | B29C 51/18 264/547 |
| 9,005,730 B2 | | 4/2015 | Patel et al. | |
| 2001/0033877 A1 | * | 10/2001 | Stammler | B29C 31/006 425/503 |
| 2005/0186303 A1 | * | 8/2005 | Crepaz | B29C 51/261 425/394 |
| 2005/0285304 A1 | * | 12/2005 | Rodrigo Perez | B29C 37/0032 264/259 |
| 2006/0105661 A1 | * | 5/2006 | Steinbach | B29C 43/22 442/327 |
| 2010/0230869 A1 | * | 9/2010 | Okazaki | B29C 51/16 264/571 |
| 2011/0074057 A1 | * | 3/2011 | Lee | B29C 51/02 264/40.5 |
| 2013/0193599 A1 | * | 8/2013 | Wrosz | B29C 51/22 264/16 |
| 2014/0004219 A1 | | 1/2014 | Cirette et al. | |
| 2015/0239170 A1 | * | 8/2015 | Borse | B29C 51/225 264/297.6 |
| 2015/0251366 A1 | | 9/2015 | Voth et al. | |

FOREIGN PATENT DOCUMENTS

| | | |
|---|---|---|
| JP | H08-1709 A | 1/1996 |
| WO | 2015035970 A1 | 3/2015 |

OTHER PUBLICATIONS

European Patent Office, Partial European Search Report in European Patent Application No. 16198658.3-1706, dated Mar. 24, 2017, 10 pages.

State Intellectual Property Office of People's Republic of China, Office Action and Search Report in Chinese Patent Application No. 201611002242X, dated Sep. 4, 2019, 18 pages.

\* cited by examiner

MODULAR THERMOFORMING SYSTEM

CROSS-REFERENCES

The following related patent is incorporated herein, in its entirety, for all purposes: U.S. Pat. No. 9,005,730.

FIELD

This disclosure relates to systems and methods for manufacturing thermoplastic objects. More specifically, the disclosed examples relate to systems and methods for manufacturing thermoplastic parts using a forming press having multifaceted mold tooling.

INTRODUCTION

The fabrication of molded interior aircraft components from thermoset composite materials is well known in the art. However, the current materials and fabrication methods for fabricating sidewall and ceiling panels for aircraft suffer from very long fabrication cycle-time, material waste and disposal cost. Known thermoset methods involve numerous processing cycles with individually fabricated components converted to sub-assemblies. The sub-assemblies are manually assembled at a significant cost and weight, and retain product deficiencies and waste. Known processes also require multiple complex tools and equipment, which require long lead times, storage facilities and infrastructure. Custom treatments of composite panels are also required to address thermal insulation and noise generated by airflow, equipment and other systems. Known processes do not allow for the integration of new decorative texture uniformity that is required by complex design configurations. The current process is also not tool-side controlled, which affords part-to-part variability and requires repairs.

Existing composite constructions often contain multiple materials that exhibit only a small difference in their thermal properties. However, the processing methods that utilize a uniform temperature field to fabricate these existing composite configurations are not optimal for many new materials or material configurations that exhibit highly variable thermal properties. While production of composite structures using these new materials may still be feasible using a multiple stage processing method, it is also inefficient in both time and energy. Single-stage processing is preferred for its efficiency.

Conventional tooling and fabrication methods also lack the capability to fabricate net size parts. This results in excessive material trim-off from the part periphery and internal cut-outs. Thermoset materials are not reusable, and thus the trimming results in added material waste, while also inducing residual stresses and embrittlement that can change the service life of the component.

Additionally, conventional tooling and fabrication methods involve lengthy change-over times with extensive, time-consuming preheating of dies and other components.

There is a need for panel fabrication processes that avoid the above-stated disadvantages and impart additional improvements.

SUMMARY

The present disclosure provides systems, apparatuses, and methods relating to forming of thermoplastic parts. In some aspects, a method of forming a thermoplastic part may include feeding a thermoplastic material into a preheating oven to form a preheated thermoplastic material; feeding the preheated thermoplastic material into a forming press to form a pressed thermoplastic part, wherein the forming press comprises a first tool and a second tool, wherein at least the first tool comprises a rotary tool having multiple faces; and finishing the pressed thermoplastic part.

In some aspects, a forming press may include a mold tool and a press tool, wherein at least one of the mold tool and press tool comprises a rotary tool having multiple faces, each face having a different mold configured for forming a different part in a thermoplastic material.

In some aspects, a system for forming a thermoplastic part may include a thermoplastic source station, a pressing station, and a finishing station, a continuous processing path being defined from a roll of thermoplastic web material at the thermoplastic source station, through the pressing station, and the finishing station.

Features, functions, and advantages may be achieved independently in various aspects of the present disclosure, or may be combined in yet other examples, further details of which can be seen with reference to the following description and drawings.

DESCRIPTION

Overview

Figure 1:
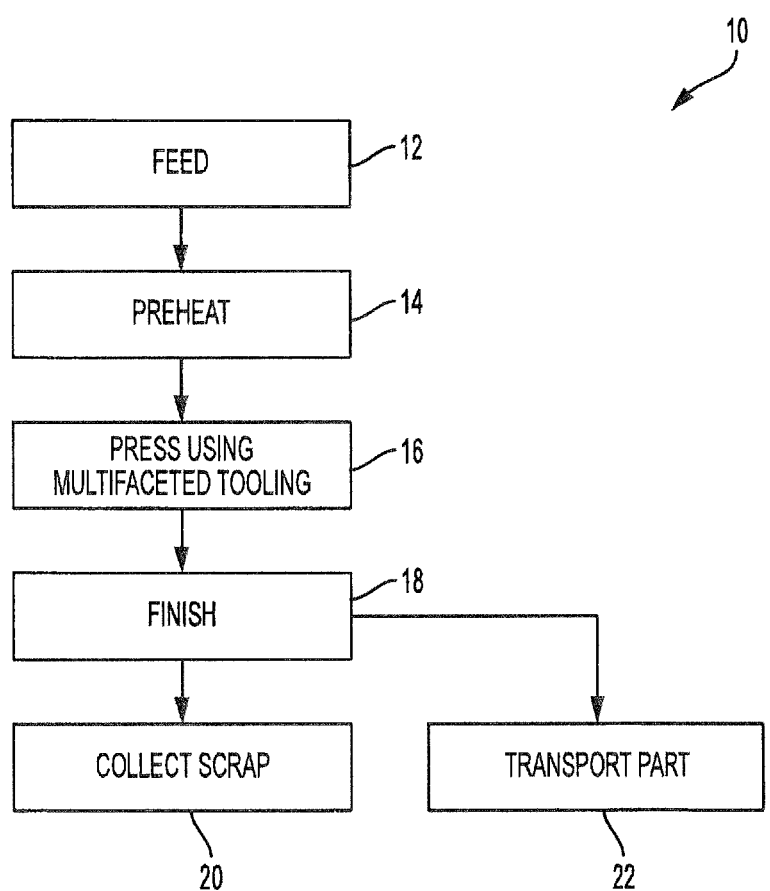
FIG. 1 is a flow chart showing steps of an illustrative method for forming a thermoplastic part using a press having multifaceted mold tooling in accordance with aspects of the present disclosure.

Various examples of a thermoforming system having rotating, multifaceted mold tooling, as well as related methods, are described below and illustrated in the associated drawings. Unless otherwise specified, a thermoforming system and/or its various components may, but are not required to, contain at least one of the structure, components, functionality, and/or variations described, illustrated, and/or incorporated herein. Furthermore, the process steps, structures, components, functionalities, and/or variations described, illustrated, and/or incorporated herein in connection with the present teachings may, but are not required to, be included in other similar thermoforming systems. The following description of various examples is merely exemplary in nature and is in no way intended to limit the disclosure, its application, or uses. Additionally, the advantages provided by the examples, as described below, are illustrative in nature and not all examples provide the same advantages or the same degree of advantages.

Thermoset methods and materials are typically used in conventional applications in various industries. For example, thermoset methods and materials have been used in the aerospace industry to manufacture non-structural, non-metallic aircraft composite parts such as ceiling panels, sidewalls, stowbins, and class dividers. Thermosetting plastics are initially soft, and are changed irreversibly to a hardened final state by curing (e.g., using heat). Thermoset operations usually involve perishable raw materials, a large amount of work in process (WIP), long warm up cycles, extensive secondary finishing operations, and lengthy changeover procedures. In contrast, use of thermoplastics and thermoforming operations to manufacture the same parts and components can include greatly reduced WIP, raw materials that may be stored indefinitely at room temperature, and substantial elimination of waste, among other benefits.

In general, a modular thermoforming system in accordance with aspects of the present disclosure may include a continuous web or sheet of thermoplastic material, which is fed (e.g., from a spooled roll of material) through one or more preheating ovens. The preheating oven heats the web to soften the thermoplastic material. The web is then fed, in continuous fashion, into a forming press, where a mating mold closes on the web. A pressure container (also referred to as a pressure box) may also close around the molded area. The mating mold tooling, comprising a male mold and a female mold (also referred to in some cases as a punch and die, respectively, or as two forming dies, or as a press tool and a mold tool) may include multifaceted components (i.e., having multiple faces). For example, a die may have a plurality of faces, each of which includes a different forming mold or die. For example, a cuboidal die or mold may include four such faces. While four faces are discussed herein, a multifaceted die may include any suitable polygonal cross section and corresponding number of faces. Each face may be configured to receive and retain replaceable tooling. In some examples, the replaceable tooling takes the form of an insert removably attachable to the face of the die.

Any one of the die faces may be placed into service, by rotating the die about an axis running parallel to the faces. Accordingly, the multifaceted tooling may be referred to as rotating, rotatable, and/or rotisserie. In some examples, the multifaceted tool may rotate about a horizontal axis. In some examples, the multifaceted tool may rotate about a vertical axis. In some examples, the multiple faces may form an array, such that faces may be moved into or out of position by horizontal translation. Each of these examples assumes a substantially horizontal processing path. Other orientations may be appropriate.

Forming may be assisted by pressure and/or vacuum, which may be facilitated by the pressure container. Additional components, such as stiffening members, may be incorporated into the formed part during the forming process, as further described below. These additional components may provide various characteristics, such as stiffening, rigidity, acoustical properties, and the like.

Following the die forming process, the web may be fed out of the press and into a finishing area. Using one or more robots or other manipulating systems, openings or apertures may be formed in the part. The same or different robotic systems may cut the part from the web, and may trim and place the part onto a receiving cart or conveyor for transport to another process, or to a storage area. Remaining portions of the web may be spooled on a receiving spool for reuse or recycling.

Definitions

"Thermoplastic" or "thermoplastics" refers to a type of plastic material (or polymer) which softens and can be formed into a new shape when heated above its glass transition temperature, and which then solidifies upon cooling, substantially retaining the new shape. This process is typically reversible and repeatable, such that thermoplastics may be recycled (e.g., reshaped). Forming may be accomplished by any suitable method, such as compression molding, vacuum molding, extrusion, injection molding, and the like, or any combination of these. Examples of thermoplastics include acrylics, acrylonitrile butadiene styrene (ABS), nylon, polyethylene, polyetherether ketone (PEEK), polypropylene, polystyrene, and polyvinyl chloride (PVC), among others. Other examples may include materials suitable for high temperature systems, such as PEI, PPS, PPSU, PEKK, and for lower temperature systems, such as polycarbonate and polyurethane.

EXAMPLES, COMPONENTS, AND ALTERNATIVES

The following sections describe selected aspects of exemplary thermoforming systems as well as related systems and/or methods. The examples in these sections are intended for illustration and should not be interpreted as limiting the entire scope of the present disclosure. Each section may include one or more distinct inventions, and/or contextual or related information, function, and/or structure.

Illustrative Thermoforming Process:

As shown in FIG. 1, this section describes selected operations of a thermoforming method 10. FIG. 1 is a flowchart illustrating operations performed by one example, and may not recite the complete process or all steps of the method. FIG. 1 depicts multiple steps of a method, generally indicated at 10, which may be performed in conjunction with thermoforming systems according to aspects of the present disclosure. Although various steps of method 10 are described below and depicted in FIG. 1, the steps need not necessarily all be performed, and in some cases may be performed in a different order than the order shown.

In an operation 12, thermoplastic material may be fed into system 10. The thermoplastic material may be fed continuously, such as from a roll or spool of material. The material may include an extruded sheet or web of thermoplastic. In some examples, the thermoplastic web may be laminated or otherwise paired with other materials, such as a decorative film, foam panels, thermoplastic honeycomb structures, unidirectional strips, and/or reinforced thermoplastic strips. Feeding of the material may be achieved by any suitable method or device. For example, powered rollers, a chain conveyor, a pin conveyor, and/or the like, or any combination of these may be utilized.

In an operation 14, the thermoplastic material may be heated (e.g., preheated), such as in an oven. For example, one or more convection and/or conduction heater elements may be disposed adjacent to the sheet of thermoplastic. For example, the sheet may be conveyed through an oven. In some examples, localized heating may be employed, such as using an infrared (IR) heating element. Localized heating may be appropriate for various applications, including thermally bonding components to a core or substrate. Furthermore, heating may be performed at one or multiple stations. For example, heating may be performed upstream of a forming press, downstream of a forming press, or both.

In an operation 16, the preheated thermoplastic material may be formed by a forming press having rotatable, multifaceted tooling. For example, a forming press may include mating molds, such that the sheet is conveyed to a position adjacent a first mold having a first mold shape. A second mold, having a second mold shape configured to mate with the first mold, may be forcibly brought into contact with the sheet, pressing the sheet onto and/or into the first mold. In other words, the forming press may be closed onto the thermoplastic sheet. The first and/or second mold may be heated, such as by an internal heating mechanism. After a predetermined time, the forming press may be opened, and the formed sheet may be cooled (actively and/or passively), such that the sheet retains a shape conforming to the press molds. One or both of the press molds may be multifaceted. In other words, different mold faces may be present on a single mold tool, such that a selected mold face can be rotated into an operational position. In some examples, both the first and the second mold tools are rotatable, such that corresponding male and female mold faces can be matched by rotating into position. In some examples, each mold tool is rotatable such that the rotational axis is transverse to the pressing motion. For example, a press in which one or both forming molds are moved vertically may include tooling that selectively rotates on a horizontal axis.

In an operation 18, the formed thermoplastic material may be finished and/or removed from the continuous sheet of material. For example, the formed thermoplastic material may comprise a part to be utilized in a larger assembly, a further step in a manufacturing process, and/or a standalone object. Accordingly, the formed material may be transformed into a finished part by operations such as scribing, cutting, trimming, punching, printing, painting, and/or the like, or any combination of these. Note that "finishing" in this context is with respect to the present operation, and not necessarily as to the overall manufacturing process. In some examples, the formed material may have one or more apertures or openings cut or punched, then be cut from the larger web of material, and trimmed to a selected tolerance. Finishing operations such as these may be performed by any suitable equipment or device, such as one or more robots having suitable end effectors, one or more punch presses, one or more printers, etc. In some examples, an industrial robot may be utilized for more than one such operation. For example, a robot may have a multi-function end effector and/or the capability of replacing end effectors as needed.

In an operation 20, the remaining portion of the thermoplastic material may be collected as recyclable scrap. Portions of the thermoplastic material may be reclaimed and recycled at any suitable location along the processing path. For example, after removal of the part from the sheet of thermoplastic material, the remaining scrap can be spooled onto a collection roll and processed for recycling. This capability adds significant flexibility to design of the parts, because scrap reduction is less of a priority than it is in processes where the scrap is unusable. For example, in this thermoplastic process, there is a greatly reduced need for tessellation or tiling of adjacent parts and/or successive parts may be spaced from each other if desired.

In an operation 22, the part that was finished in step 18 may be transported, such as to a subsequent manufacturing process, a storage area, a shipping area, or the like. For example, a pick-and-place robot or other machine may be used to remove the finished part from the finishing area and to place the finished part onto a transportation cart, onto a conveyor, or into a container. Multiple finished parts may be stacked or otherwise arranged for storage or transportation.

Figure 2:
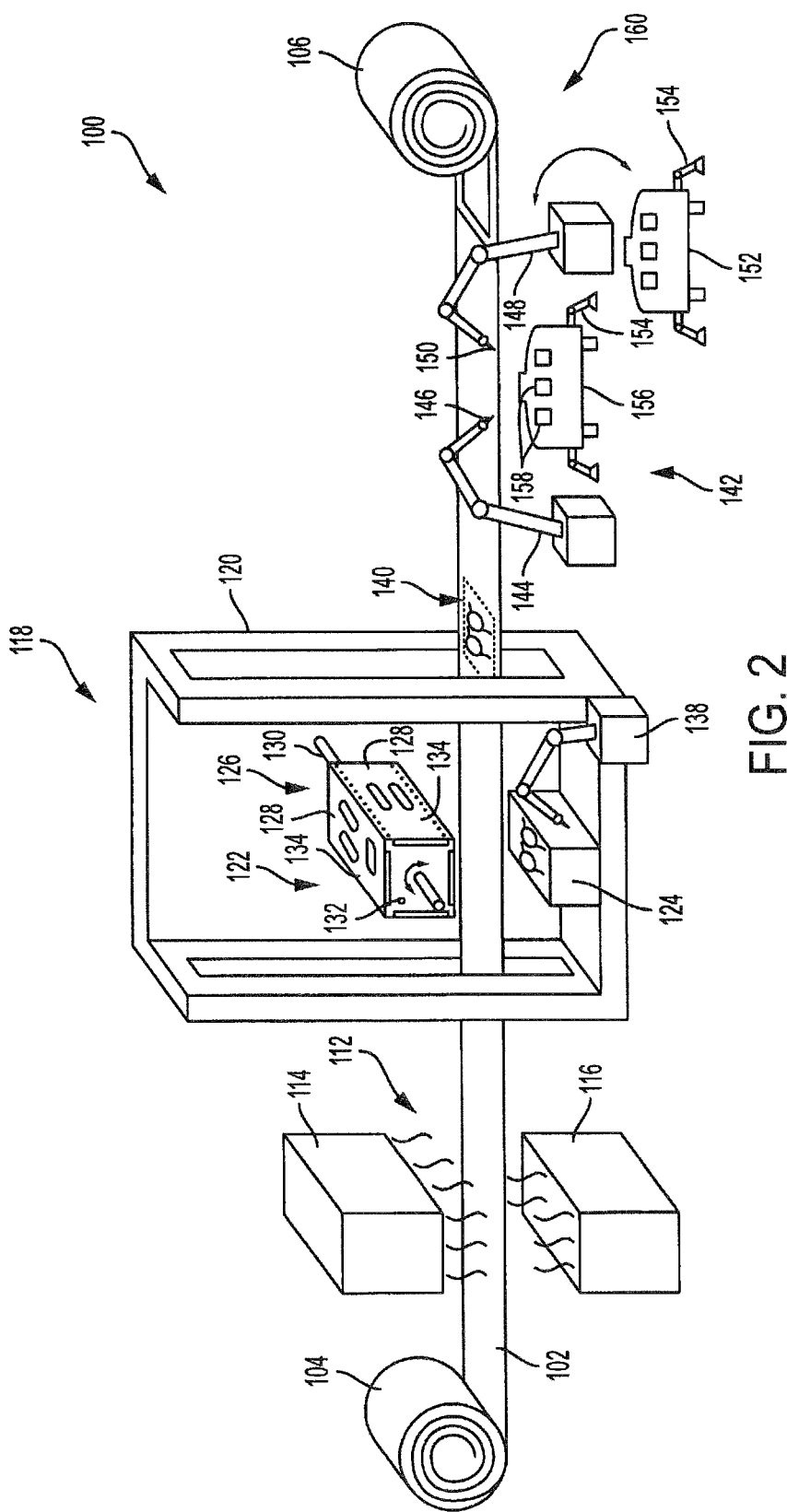
FIG. 2 is a schematic diagram of an illustrative manufacturing system for forming thermoplastic parts in accordance with aspects of the present disclosure.
Figure 3:
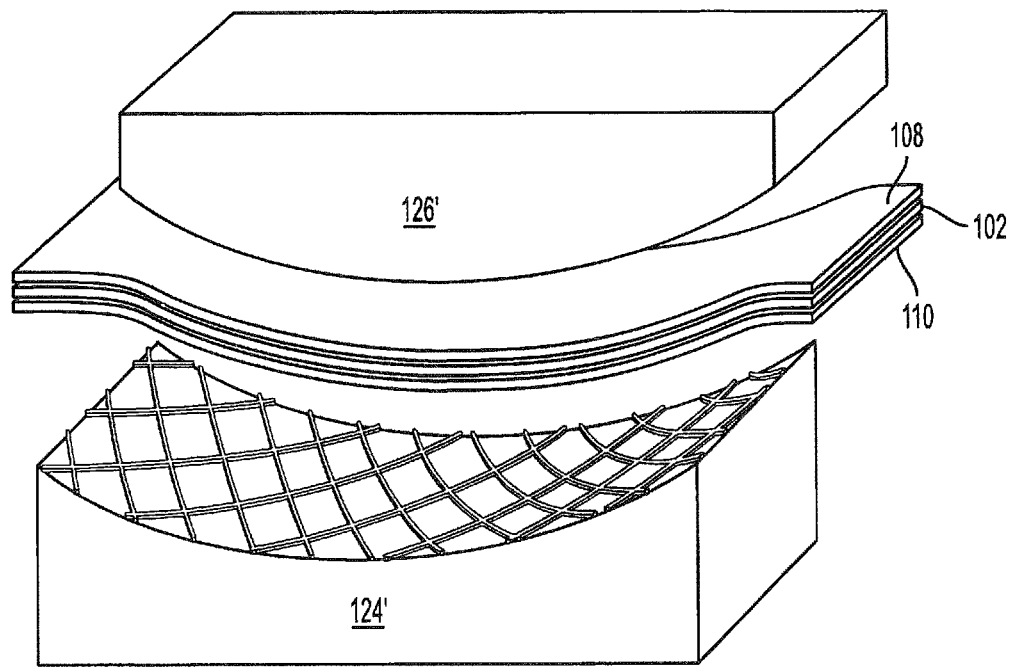
FIG. 3 is a schematic diagram of an illustrative forming press having textured mold tooling.

Illustrative Thermoforming System:

As shown in FIGS. 2-4, this section describes a thermoforming system 100, which, among other things, may be suitable for implementing method 10.

Figures 4A, 4B:
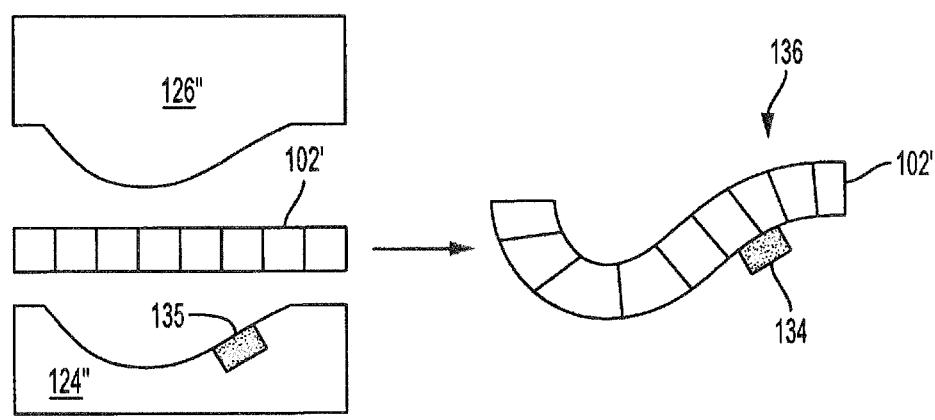
FIGS. 4A and 4B depict a schematic diagram of an illustrative forming press showing incorporation of additional materials, and an illustrative part resulting from the process.

FIG. 2 is a schematic diagram of thermoforming system 100 incorporating a roll-to-roll process, a forming press having multifaceted tooling, and a modular design. FIG. 3 is a schematic partial view of an illustrative forming press, showing a textured mold and a three-layer web material. Although three layers are portrayed, any suitable number of layers may be utilized. FIGS. 4A and 4B depict a schematic partial side view of an illustrative forming press, showing simultaneous thermoforming of a thermoplastic material and integration of an additional component into a formed part.

With reference to FIG. 2, thermoforming system 100 includes a sheet or web of thermoplastic 102 continuously fed through a process from a first roll 104 to a second roll 106. Thermoplastic 102 may include any suitable thermoplastic, and may further include one or more additional layers of material laminated or otherwise affixed to the thermoplastic substrate. For example, a decorative film may be laminated on either face of the thermoplastic layer, such as depicted in FIG. 3, where thermoplastic 106 is sandwiched between a top decorative film layer 108 and a bottom decorative film layer 110.

More or fewer component layers, facings, and configurations may be used with system 100. In some examples, component layers may be fed through the system separately, being bonded or laminated together in the thermoforming process. Various aspects of layered panel manufacturing are further described in U.S. Pat. No. 9,005,730, the entirety of which is hereby incorporated herein for all purposes.

In some examples, an interior aircraft panel formed by system 100 may have a pair of thermoplastic sheets (also referred to as facings) separated by a reinforcement core to enhance properties such as noise attenuation, thermal insulation, or structural rigidity. The reinforcement core may include any suitable material disposed between the two facings to improve certain panel properties such as acoustic attenuation, thermal insulation and/or strength to support compressive fastening loads and provide increased stiffness. The core may be provided from a roll, or may be provided as individual panels. The core may be a honeycomb core (for strength), an open-cell or closed-cell foam for acoustic and/or thermal insulation, or a fibrous mat for acoustic and/or thermal insulation or a combination thereof (e.g., a combination of foam core and honeycomb core). Alternatively or additionally, a closed-cell or open-cell (or combination thereof) foam core or a fibrous mat having thermal and/or acoustic insulation properties may be attached to the external surface of one of the facings.

The core may include one or more rods to improve noise attenuation. The rods may be solid or hollow in cross-section and composed of polymer, metal, non-metal or various combinations thereof, such as metallic wire covered with plastic. In a preferred example, the polymer rods may be fabricated from a thermoplastic material such as polyetherimide, polyphenisulfone or polyarylsulfone.

The decorative or ornamental film(s) may be opaque or transparent, patterned or printable (e.g., polyvinylfluoride and polyvinyldinefluoride). A transparent film may be printed from the backside using ultra-violet radiation to protect the film from solvent abrasion and fading. A decorative film material that is compatible with the plastic substrate may be automatically integrated to the base facing during the forming cycle by fusion (heat and pressure). Another option is to install heat-activated adhesive film.

Thermoplastic sheet 102 is fed through a preheat oven 112. Preheat oven 112 may include any suitable heating component configured to raise the temperature of thermoplastic sheet 102 prior to downstream thermoforming operations. Preheat oven 112 may include an upper heating element 114 and a lower heating element 116, such that both major faces of sheet 102 are heated, e.g., evenly. One or more preheat ovens 112 may be present. Ovens may be modular and portable, such that different numbers and/or types of ovens may be placed online as needed.

Following the preheat oven, thermoplastic sheet 102 is fed into a thermoforming press 118, also referred to as a pressing station. Thermoforming press 118, which is shown schematically in FIG. 2, includes an outer housing 120 and mold tooling 122. Outer housing 120 may include any suitable structure configured to separate the forming apparatus from the outside environment, such as for personnel safety reasons and/or contaminant prevention. A pressure box or pressure container (not pictured) may also be present to selectively control pressurization/depressurization of the forming area.

Mold tooling 122 may include a pair of mating tools. In the example depicted in FIG. 2, mold tooling includes a mold tool 124 and a corresponding press tool 126. Mold tool 124 may have a first topology including a male portion, a female portion, or a combination thereof, corresponding to the desired shape of a panel or other part being manufactured. Mold tool 124 is the lower of the two tools, and is configured to remain stationary during operation of forming press 118.

Press tool 126 is the upper of the two tools, and is configured to translate up and down relative to mold tool 124 during operation. Press tool 126 has a second topology configured to mate with the first topology of mold tool 124. In general, forming press 118 operates in similar fashion to a standard forming press, in that the mating tools come together, with sheet 102 between them, to form the thermoplastic sheet into a desired configuration. For example, the press may generate aircraft interior panels.

In contrast to known thermoforming presses, however, press tool 126 may include a selectively rotatable or rotary tool having multiple faces 128, wherein each face has a functional press tool topology. For example, as shown in FIG. 2, press tool 126 may include four faces on a cuboidal tool. Press tool 126 may be selectively rotatable, as described, e.g., on an axle 130 having a substantially horizontal orientation. Press tool 126 would remain fixed with respect to the axle during normal operations. Rotation of press tool 126 would be performed when a different topology was desired, such that a different face should be presented to the opposing mold tool. This may be performed, for example, when changing from one product line to another, or when changing the desired molding characteristics.

The number of tool faces 128 may be selected based on several factors, including the number of different panels to be manufactured for a given project or a specified vehicle (e.g., aircraft model). Any suitable number of faces 128 may be present. Any or all of the faces may be utilized in pressing operations. In some examples, one or more faces may be used for other purposes, such as to store reserve tooling accessories in a heated environment.

Press tool 126 and/or mold tool 124 may be heated, such as by an internal heating mechanism. For example, the heating mechanism may include an inductive heating element 132 disposed in press tool 126 and/or in mold tool 124. In some examples, press tool 126 may be heated to a higher temperature than mold tool 124.

Each face 128 of press tool 126 may include a removable insert 134, such that the press tool is configured to securely receive the inserts. Inserts 134 each include a specific topology to be used in pressing the thermoplastic sheet. For example, one insert 134 may include two projections and one recess, while another insert 134 includes a single curved surface. Use of such inserts facilitates a standard press tool that does not need to be replaced when desired topologies change, such as when pressing parts for a different project or aircraft model. Time that would typically be used to heat the press tool is also reduced, because the tool itself remains in place during change overs. Only the tooling inserts need to be replaced.

The set of inserts may include inserts 134 comprising any suitable material configured to withstand forming pressures and temperatures, and to conduct heat to the thermoplastic sheet. In some examples, inserts 134 are metallic. In some examples, one or more inserts 134 are made of a 3-D printable material. Printable inserts allow rapid prototyping, repairs, and responsive design changes, among other benefits.

In some examples, mating of the press tool and the mold tool can only be achieved if both the press tool and the mold tool are changed to corresponding topologies. In those examples, both press tool 126 and mold tool 124 may be rotatable and include multiple faces. In other examples, mold tool 124 may be changed over by complete replacement, such as by removal of a first mold tool and installation of a second mold tool. In other examples, mold tool 124 may be usable with multiple different press tool face inserts. In still other examples, only a single tool may be used, such as in a vacuum forming operation.

Turning to FIG. 3, an illustrative example of a mold tool 124' and a press tool 126' are shown, in which mold tool 124' includes a textured surface. Any suitable textured surface may be utilized and transferred to the thermoplastic part during the pressing operation. The textured surface is optional, and may be selected based on desired characteristics of the molded part. Similarly, press tool 126' may or may not include a textured surface.

FIGS. 4A and 4B show another illustrative example of a mold tool 124" and a press tool 126", wherein mold tool 124 is configured to receive a component 135 to be integrated into a pressed part 136. When a thermoplastic sheet 102' is pressed between mold tool 124" and press tool 126" to form pressed part 136, component 135 is fused to the part by a combination of heat, pressure, and/or adhesive.

Returning to FIG. 2, the pressing station may include a pick-and-place industrial robot 138 or the like. Robot 138 may include any suitable industrial equipment configured to place items such as component 135 onto mold tool 124 and/or press tool 126, and/or to assist with changing over the press tooling. For example, robot 138 may assist in interchanging mold parts for specific tool configurations.

Following the pressing operation, a formed part 140, which may be pre-cut or still unitary with sheet 102, will exit the press and proceed to a finishing station 142. A finishing robot 144 may be disposed adjacent to sheet 102 in finishing station 142, such that the finishing robot is capable of performing finishing operations on formed part 140. For example, finishing robot 144 may include an end effector 146 that has tools for cutting, punching, grinding, sanding, etching, heating, bonding, fastening, rotating, drilling, and/or the like, or any combination of these. Accordingly, finishing robot 144 may perform operations on part 140, such as formation of windows, apertures, surface features, and the like. In some examples, finishing robot 140 may cut part 140 from sheet 102 and/or perform trimming of the part. In other examples, a separate trimming station may be established.

A second robot 148 may be stationed at the finishing station or trimming station. Robot 148 may be a pick-and-place robot having an end effector 150 configured for removing part 140 from sheet 102, possibly trimming the part, and placing the part on a nearby cart 152 or other conveyance or container. Cart 152 may include any suitable cart, such as a wheeled cart having a receiving surface for securely receiving one or more parts 140 from robot 148. In some examples, cart 152 may include one or more clamping mechanisms 154 removably securable to corresponding features of the floor or other support surface. Such clamping ensures the carts are positively located.

A second cart 156, which may be similar to cart 152, may be disposed between or adjacent to robots 144 and 148. Cart 156 may include alternative and/or replacement tools or end effector parts usable by the robots, indicated at 158. Robot 144 and/or robot 148 may be configured to automatically replace certain tools at specified intervals, e.g., based on time or number of operations performed. In some examples, an operator may initiate such tool changes, e.g., by remote, programmed control of a robot.

Following the finishing station and/or trimming station, a scrap recovery station 160 may include take-up roll 106 to collect what remains of sheet 102 after pressed and finished parts are removed.

Selected Additional Examples:

This section describes additional aspects and features of thermoforming systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A. A method of forming a thermoplastic part, the method comprising steps of: feeding a thermoplastic material into a preheating oven to form a preheated thermoplastic material; feeding the preheated thermoplastic material into a forming press to form a pressed thermoplastic part, wherein the forming press comprises a first tool and a second tool, wherein at least the first tool comprises a rotary tool having multiple faces; and finishing the pressed thermoplastic part.

A1. The method of paragraph A, wherein each face of the rotary tool has a different mold configuration, the method further comprising the step of: rotating the rotary tool to change which face is directed toward the second tool.

A2. The method of any of paragraphs A to A1, wherein the first tool is a press tool, and the second tool is a mold tool.

A3. The method of paragraph A2, wherein the press tool and the mold tool are configured to mate with each other.

A4. The method of any of paragraphs A to A3, wherein the rotary tool has four faces.

A5. The method of any of paragraphs A to A4, wherein each face of the rotary tool has receiving structure for securing interchangeable inserts, each insert having a different mold configuration, the method further comprising the step of: removing a first insert from a receiving structure on the rotary tool, and replacing it with a second insert.

A6. The method of any of paragraphs A to A5, further comprising the step of: translating a web of thermoplastic material from a roll upstream of the preheating oven through a continuous processing path.

A7. The method of any of paragraphs A to A6, further comprising: trimming the thermoplastic material downstream of the forming press.

A8. The method of any of paragraphs A to A7, further comprising the step of: heating one or more of the faces from inside the rotary tool.

A9. The method of paragraph any of paragraphs A to A8, further comprising the step of: embedding an accessory component in the thermoplastic material using the forming press.

A10. The method of any of paragraphs A to A9, wherein each of the first tool and the second tool in the forming press comprises a rotary tool having multiple faces.

A11. The method of any of paragraphs A to A10, further comprising the step of: robotically placing mold parts on the mold tool corresponding to a specific insert panel on a face of the press tool.

A12. The method of any of paragraphs A to A11, further comprising the step of: pressing a textured tool surface onto the thermoplastic material in the forming press.

A13. The method of any of paragraphs A to A12, wherein the rotary tool rotates around a substantially horizontal axis to change application of different faces of the rotary tool.

A14. The method of any of paragraphs A to A13, wherein a continuous processing path is defined from a roll of thermoplastic material upstream of the preheating oven through the forming press to a finishing station.

A15. The method of paragraph A14, wherein the rotary tool rotates around an axis transverse to the direction of the processing path to change application of different faces of the rotary tool.

A16. The method of any of paragraphs A to A15, further comprising the step of: loading a set of inserts into the rotary tool corresponding to a set of interior panels configured for assembly in a specific aircraft design.

A17. The method of any of paragraphs A to A16, further comprising the step of:

stopping feeding of the web during a pressing step, and simultaneously cutting and removing a finished part from the processing path downstream from the forming press.

A18. The method of any of paragraphs A to A17, further comprising the step of: supplying the thermoplastic material with a preformed ornamental design.

B. A forming press comprising: a mold tool and a press tool, wherein at least one of the mold tool and press tool comprises a rotary tool having multiple faces, each face having a different mold configured for forming a different part in a thermoplastic material.

B1. The forming press of paragraph B, each face of the rotary tool has receiving structure for securing interchangeable inserts, each insert having a different mold configuration.

B2. The forming press of any of paragraphs B through B1, wherein each of the mold tool and the press tool comprises a rotary tool having multiple faces.

B3. The forming press of any of paragraphs B through B2, wherein the rotary tool has four faces.

B4. The forming press of any of paragraphs B through B3, wherein the rotary tool has an associated (e.g., internal) heating mechanism.

B5. The forming press of any of paragraphs B through B4, wherein the rotary tool carries a set of inserts corresponding to a set of thermoplastic interior panels configured for assembly in a specific aircraft design.

C. A system for forming a thermoplastic part, comprising: thermoplastic source station, a pressing station, and a finishing station, a continuous processing path being defined from a roll of thermoplastic web material at the thermoplastic source station, through the pressing station, and the finishing station.

C1. The system of paragraph C, further comprising: a preheating station upstream from the pressing station.

C2. The system of any of paragraphs C through C1, wherein the pressing station includes a rotary tool having multiple faces for forming different parts.

C3. The system of any of paragraphs C through C2, wherein the pressing station includes a mold tool and a press tool, each tool comprising a rotary tool having multiple faces for forming different parts.

C4. The system of any of paragraphs C through C3, wherein the pressing station includes a tool having an internal heating mechanism.

C5. The system of any of paragraphs C through C4, further comprising: a robot at the pressing station configured for interchanging mold parts for specific tool configurations.

C6. The system of any of paragraphs C through C5, further comprising: a trimming station downstream from the pressing station.

C7. The system of any of paragraphs C through C6, further comprising: a processor programmed to control translation of the thermoplastic web material through the processing path, and operation of apparatus at the stations.

D. A method of expanding manufacturing capability through modularity and flexibility of one or more heating cells, pressing stations, secondary operation assembly cells, and/or the utilization of rolls of material, consolidating all the material components in one flow operation utilizing rotary tooling.

E. The system or method of any other numbered paragraph, wherein the rotary tool is instead an array of tooling surfaces that are translatable into and out of the press.

E1. The system or method of paragraph E, wherein the array is cylindrical

E2. The system or method of paragraph E, wherein the array is horizontally translatable.

E3. The system or method of paragraph E, wherein a first tool is horizontally translatable and a second tool is rotatable.

F. A modular transportation and heating system that allows for a variety of material forms, such that if a particular part requires a non-rolled raw material, the production system is flexible to allow feeding in sheet material.

F1. The system of paragraph F, including a combination of rolled materials and sheet materials to combine into a consolidatable composite.

G. The system or method of any other numbered paragraph, wherein the thermoplastic web material includes a thermoplastic composite comprising a thermoplastic web and at least one additional thermoplastic component.

G1. The system or method of paragraph G, wherein the at least one additional component includes a solid sheet.

G2. The system or method of paragraph G, wherein the at least one additional component includes at least one material chosen from the following set: a woven material, a nonwoven material, an open-cell foam, a closed-cell foam, a thermoplastic honeycomb, a reinforced laminate, and a sprayed fiber material.

Advantages, Features, Benefits

The different examples of thermoforming systems described herein provide several advantages over known solutions for manufacturing parts such as interior panels for aircraft. For example, illustrative embodiments described herein allow continuous feeding of a sheet of material through the system, from roll to roll without any kits or blanks.

Additionally, and among other benefits, illustrative embodiments described herein allow integration of color, texture, and/or ornamental designs in or on the thermoplastic material.

Additionally, and among other benefits, illustrative embodiments described herein allow multiple mold tooling faces on a single rotatable core, facilitating rapid changeover of the process. Additionally, replaceable tooling inserts permit additional flexibility and changeability.

Additionally, and among other benefits, illustrative embodiments described herein allow modularity of system components, such that different types or numbers of each component may easily be included.

Additionally, and among other benefits, illustrative embodiments described herein allow recycling and reuse of scrap material.

No known system or device can perform these functions, particularly with respect to manufacturing of aircraft interior panels. However, not all embodiments described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of forming a molded thermoplastic part along a continuous processing path, the method comprising the steps of:

receiving a continuous web of thermoplastic material from a thermoplastic source station at an upstream end of the continuous processing path;

feeding the continuous web of thermoplastic material into a preheating oven downstream from the thermoplastic source station to form a continuous web of preheated thermoplastic material;

feeding the continuous web of preheated thermoplastic material into a forming press at a pressing station to form a pressed thermoplastic part downstream from the preheating oven, wherein the forming press comprises a first tool and a second tool, wherein at least the first tool comprises a rotary tool having multiple faces and each of the faces has a different mold configuration and the second tool having a mold shape configured to mate with the mold configuration on at least one of the faces of the first tool, rotating the first tool to change which face is directed toward the second tool, while the second tool remains fixed;

pressing the continuous web of preheated thermoplastic material between the first and second tools at the pressing station;

cooling the continuous web of preheated thermoplastic material downstream from the pressing station to form a continuous web of cooled thermoplastic material;

cutting a molded thermoplastic part from the continuous web of cooled thermoplastic material; and finishing the molded thermoplastic part at a finishing station at a downstream end of the continuous processing path.

2. The method of claim 1, further comprising the step of: providing localized heating to the molded thermoplastic part from inside of the second tool at the pressing station.

3. The method of claim 1, wherein the first tool is a press tool, and the second tool is a mold tool, and the press tool and the mold tool are configured to mate with each other by moving the press tool vertically while the mold tool remains stationary.

4. The method of claim 1, wherein each face of the rotary tool has receiving structure for securing interchangeable inserts, each interchangeable insert having a different mold configuration, the method further comprising the step of:

removing a first insert from a receiving structure on the rotary tool and replacing it with a second insert.

5. The method of claim 1, further comprising the step of: translating the continuous web of thermoplastic material from a roll upstream of the preheating oven through the continuous processing path.

6. The method of claim 1, further comprising the step of: heating one or more of the faces from inside the rotary tool.

7. The method of claim 1, wherein the rotary tool rotates around a substantially horizontal axis to change application of different faces of the rotary tool.

8. The method of claim 1, wherein the continuous processing path is defined from a roll of continuous web of thermoplastic material upstream of the preheating oven through the forming press to a finishing station.

9. The method of claim 8, wherein the rotary tool rotates around an axis transverse to a direction of the processing path to change application of different faces of the rotary tool.

10. The method of claim 1, wherein the rotary tool has four faces.

11. The method of claim 1, wherein the first tool is movable vertically to press the continuous web of preheated thermoplastic material without rotating the first tool.

12. The method of claim 1, wherein each different mold configuration conforms to a different product line.

13. The method of claim 1, wherein the pressing step is carried out along a vertical axis.

14. The method of claim 1, wherein the pressing step is carried out after stopping the feeding step.

15. A method of forming a thermoplastic molded shape, the method comprising the steps of:

(a) feeding a continuous web of thermoplastic material into a preheating oven to form a continuous web of preheated thermoplastic material;

(b) feeding the continuous web of preheated thermoplastic material into a forming press, wherein the forming press comprises a first tool and a second tool, wherein the first tool comprises a multifaceted rotary press tool and the second tool comprises a multifaceted rotary mold tool, such that at least a face of the first tool is configured to mate with a face of the second tool to form the forming press;

(c) rotating the first tool to an operational first position to form the forming press having a first mold shape;

(d) moving the first tool towards the second tool;

(e) stopping the feeding steps;

(f) pressing a first section of the continuous web of preheated thermoplastic material between the first and second tools to form a thermoplastic molded part on the continuous web of preheated thermoplastic material with the first mold shape;

(g) moving the first tool away from the second tool to open the forming press;

(h) cooling the continuous web of preheated thermoplastic material with the first mold shape to form a continuous web of cooled thermoplastic material;

(i) removing the thermoplastic molded part having the first mold shape from the continuous web of cooled thermoplastic material;

(j) moving an adjacent section of the continuous web of thermoplastic material into the forming press; and (k) repeating steps (c) to (j) with different operational positions to form thermoplastic molded parts with different mold shapes on adjacent sections of the continuous web of thermoplastic material.

16. The method of claim 15, further wherein the first tool or the second tool has a textured surface.

17. The method of claim 15, further comprising the step of:

embedding an accessory component in the continuous web of preheated thermoplastic material using the forming press.

18. The method of claim 15, wherein the continuous web of thermoplastic material has a preformed ornamental design.

19. The method of claim 15, further comprising the step of:

trimming the thermoplastic molded part after the removing step.

20. The method of claim 15, further comprising the step of:

translating the continuous web of cooled thermoplastic material, devoid of the thermoplastic molded part, to a downstream roll at a downstream end of a continuous processing path.

* * * * *